United States Patent [19]

Egner-Walter et al.

[11] Patent Number: 4,641,389
[45] Date of Patent: Feb. 10, 1987

[54] WINDSHIELD WIPER SYSTEM

[75] Inventors: Bruno Egner-Walter, Heilbronn; Eckhardt Schmid, Brackenheim; Wolfgang Scholl, Gemmrigheim, all of Fed. Rep. of Germany

[73] Assignee: SWF Auto-Electric GmbH, Bietigheim-Bissingen, Fed. Rep. of Germany

[21] Appl. No.: 727,820

[22] Filed: Apr. 26, 1985

[30] Foreign Application Priority Data

May 10, 1984 [DE] Fed. Rep. of Germany ....... 3417268

[51] Int. Cl.4 .............................................. B60S 1/26
[52] U.S. Cl. ................................................. 15/250.21
[58] Field of Search ........... 15/250.13, 250.21, 250.23, 15/250.29, 250.3, 250.35

[56] References Cited

U.S. PATENT DOCUMENTS 3,831,221 8/1974 Gmeiner et al. ................ 15/250.21
4,447,928 5/1984 Schuch et al. .................... 15/250.21

FOREIGN PATENT DOCUMENTS 2215307 10/1973 Fed. Rep. of Germany ... 15/250.21
2225339 12/1973 Fed. Rep. of Germany ... 15/250.21
2417128 10/1975 Fed. Rep. of Germany ... 15/250.21

Primary Examiner—Peter Feldman
Attorney, Agent, or Firm—Donald J. Lenkszus

[57] ABSTRACT

A gearing of a reciprocating wiper system has two toothed wheels meshing with each other of which one is firmly connected with a crank. The mesh of a given tooth of one toothed wheel in a given space width of the other toothed wheel corresponds to a particular position of the crank. To facilitate assembly and to reduce the risk of assembly errors, in a particular position of the crank one toothed wheel has only one tooth which may be axially pushed into one space width of the other toothed wheel such that the meshing of the tooth in the space width corresponds to the particular position of the crank.

19 Claims, 5 Drawing Figures

WINDSHIELD WIPER SYSTEM

BACKGROUND OF THE INVENTION

This invention pertains to a reciprocating wiper system for motor vehicles.

German specification OS No. 2,215,307 shows a reciprocating wiper system in which a guide member is driven in pendulum fashion via a wiper shaft. A toothed wheel is rotatably mounted in the guide member. The axis of the wheel does not coincide with the axis of the wiper shaft. A crank is connected to the wheel in a manner protected against twisting. A coupling rod is articulated to the free end of the crank and to a slide which is mounted in the guide member in such a way that it may run linearly in and out radial to the wiper shaft. The movement of the slide is achieved in that the toothed wheel meshes with a stationary crown gear while the guide member is swiveled and the axis of this crown gear coincides with the axis of the wiper shaft.

When a particular tooth of the toothed wheel is in mesh with a predetermined space width of the crown gear, the crank, the coupling rod and the slide are in a predetermined position. When the guide member and the crown gear are mounted, care has to be taken with the position of the gearing elements.

German specification OS No. 2,417,128 shows a reciprocating wiper system in which a toothed wheel mounted in a housing driven in pendulum fashion meshes with a stationary toothed wheel. The toothed wheel moved in pendulum fashion is also connected with a crank in a manner protected against twisting. However the rotary movement of the crank is now transformed to a to-and-fro movement of the slide via a toothed rack, two further toothed wheels and a second toothed rack. As in the wiper system outlined above, care has to be taken when the housing with all gearing elements accommodated therein is mounted on the base plate carrying the stationary toothed wheel, to make certain that the toothed wheel mounted in the housing meshes with the stationary toothed wheel in accordance with the position of the gearing elements.

The same problem arises with the mounting of a reciprocating wiper system described in U.S. Pat. No. 3,003,173 in which along with the toothed wheel that meshes with the stationary toothed wheel in a manner protected against twisting, a further toothed wheel is connected into which engages a slide having a portion formed like a toothed rack. The system of the German Pat. No. 3,125,628, in which the toothed wheel meshing with a stationary crown gear is only an intermediate wheel meshing with a further toothed wheel with which a crank is connected in a manner protected against twisting, entails the same mounting difficulties.

SUMMARY OF THE INVENTION

In accordance with the invention, a gearing of a reciprocating wiper system has two toothed wheels meshing with each other of which one is firmly connected with a crank. The mesh of a specific tooth of one toothed wheel in a specific space width of the other toothed wheel corresponds to a particular position of the crank. To facilitate assembly and to reduce the risk of assembly errors, in a particular position of the crank one toothed wheel has only one tooth which may be axially pushed into one space width of the other toothed wheel such that the meshing of the tooth in the space width corresponds to the particular position of the crank.

BRIEF DESCRIPTION OF THE DRAWINGS

The invention will be better understood from a reading of the following detailed description of two embodiments in conjunction with the drawing in which.

DETAILED DESCRIPTION

Figure 1:
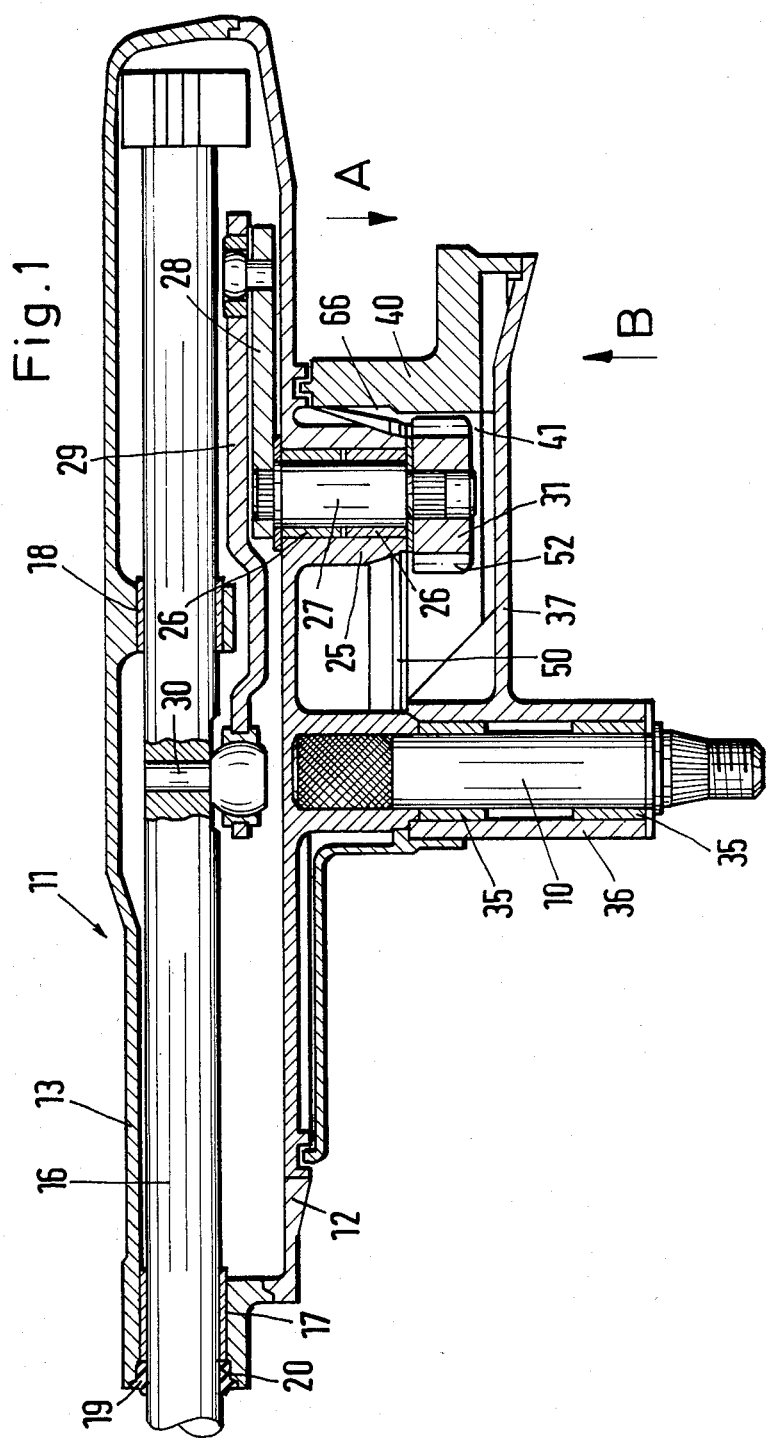
FIG. 1 is a longitudinal section through a reciprocating wiper system according to the invention in which a toothed wheel meshing with a stationary crown gear is connected with a crank in a manner protected against twisting.

In the wiper system shown in FIGS. 1 to 4 a housing 11 is mounted on a wiper shaft 10 in a manner protected against twisting. The housing is part of a wiper arm and includes a base 12 and a cover 13. The base 12 is fastened on the wiper shaft 10. Piston 16, which is cylindrical apart from a few flattenings, is mounted in two bearings 17 and 18 within the housing in such a way that it can be displaced in the radial direction relative to the axis of rotation of the wiper shaft 10. Piston 16 projects from the front 19 of housing 11. Front bearing 17 directly joins front 19 of housing 11. Seal 20 is intended to prevent dirt from entering into the housing between the housing 11 and the piston 16. A rear bearing 18 is spaced from the bearing 17. The spacing is slightly larger than the lift provided for the piston.

As viewed from front 19 of housing 11, the base 12 has a sleeve 25 positioned behind the wiper shaft 10 and below the piston 16. Sleeve 25 substantially extends away from the interior of the housing 11 to the outside. Two bearing bushings 26 are press fit into the sleeve 25. The bearing bushings 26 receive a shaft 27 which projects on one side into the interior of the housing 11 and at the other side projects beyond the sleeve 25 of the base 12. Within the housing 11 one of the knurled, projecting parts carries a crank 28 in a manner protected against twisting. Crank 28 is rotatably linked at its free end to a coupling rod 29. Coupling rod 29 has its front end articulated to piston 16 between the two bearings 17 and 18. On the other knurled portion of the shaft 27 a toothed wheel 31 is fastened in a manner protected against twisting.

The wiper shaft 10 is mounted in two bearing bushings 35, which are inserted in a bearing sleeve 36 of a base plate 37. On the base plate 37 is also fitted a crown gear portion 40 with an internal crown gear 41 whose axis coincides with the axis of the wiper shaft 10. The crown gear portion 40 is directly adjacent to the base plate 12 of the housing 11. The crown gear 41 itself is spaced from the base plate 12 and, as can be seen from FIG. 2, it extends over approximately 180 degree.

Housing 11 can be regarded as a web and the toothed wheel 31 as a planet wheel of a planetary gearing to which the crown gear portion 40 belongs as a sun wheel. If the wiper shaft 10 is driven in pendulum fashion the toothed wheel 31 runs to and fro on the crown gear 41. Wheel 31 is thereby caused to turn about its axle and thus also turns the crank 28 relative to the housing 11. The rotary motion of the crank 28 is transformed to a to-and-fro movement of the piston 16 via coupling rod 29.

In FIG. 1 the reciprocating wiper system is drawn in such a way that the toothed wheel 31 is located in the middle of the crown gear 41 and the piston occupies the stationary point in which it is drawn farthest back into the housing 11. The reduction between the crown gear 41 and the toothed wheel 31 is chosen such that for half a cycle, i.e., from one stationary point of the wiper shaft 10 to the other, the piston 16 is moved from the vicinity of the rear stationary point shown in FIG. 1 via the front stationary point, to the rear stationary point, back to the front stationary point and again into the vicinity of the rear stationary point. The angle of rotation of the wiper shaft 10 is thereby not quite 180 degree.

During assembly the toothed wheel 31 and the crown 41 must engage in such a way that the piston 16 is in the rear stationary point, when the toothed wheel 31 just moves over the middle of the crown gear 41. To achieve this, crank 28, coupling rod 29 and piston 16 could be brought into a certain position and then while the wiper shaft 10 is pushed into the bearing bushes 35, the housing could be held at such an angular distance to a radius through the center of the crown gear 41, that the toothed wheel 31 engages with the crown gear 41 in accordance with the position of the piston 16. If the extension of 180 degree of the crown gear 41 cannot be fully used so there are three right possibilities of meshing, if the piston 16 is located in its rear stationary point and two of them, if the piston is in its front stationary point and in each position in between there are four right possibilities of meshing.

If the mounting were carried out as described there would be two error sources. On the one hand the position of the piston 16 thus that of coupling rod 29 and of crank 28 could not be adjusted properly and on the other hand the angular position of the housing 11 could be incorrect. To facilitate mounting and to reduce the error rate in the embodiment shown it is only possible to push the toothed wheel 31 into the crown gear 41 in a single angular position of the housing 11 relative to the crown gear portion 40. Therefore an error can only occur in the adjustment of the piston 16.

Figure 2:
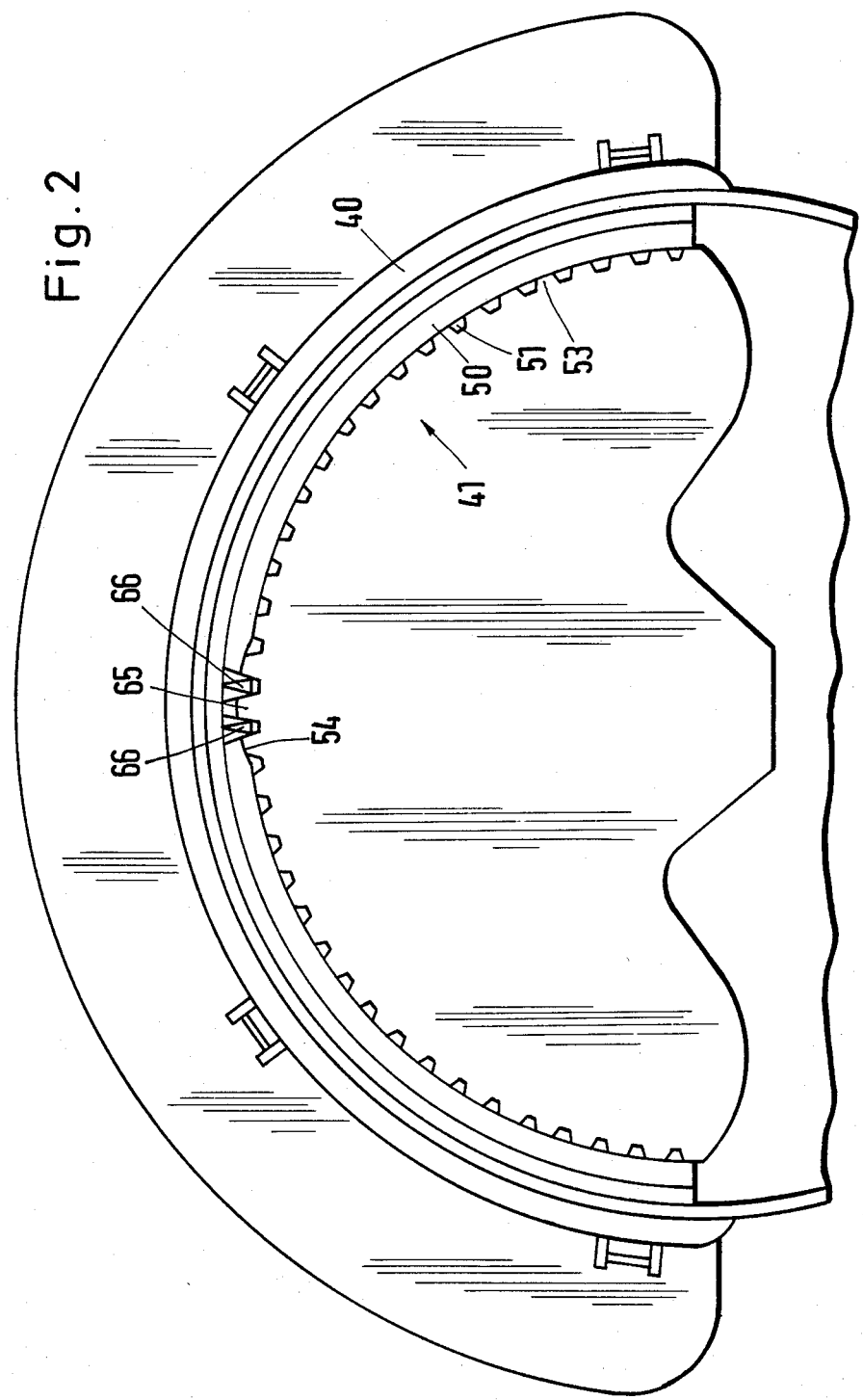
FIG. 2 is a view of the crown gear turned at 90 degree in the direction of arrow A in FIG. 1.
Figure 3:
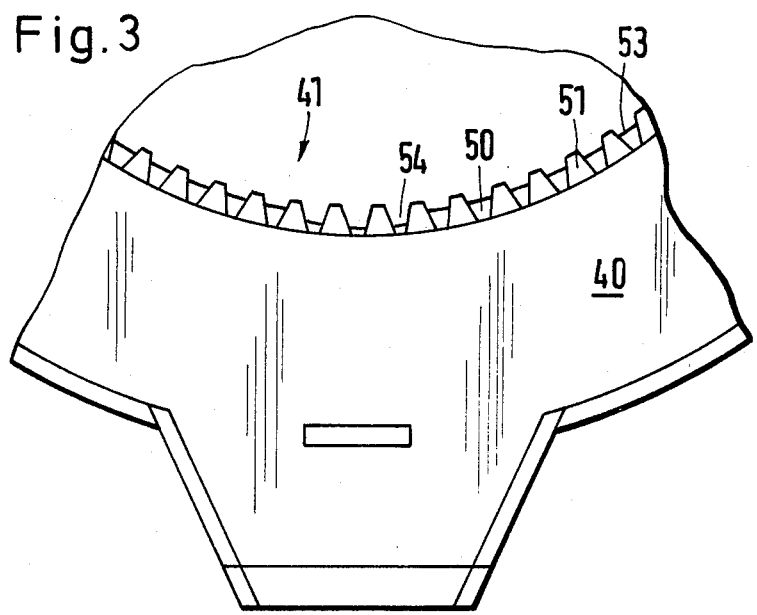
FIG. 3 is a view of the crown gear in the direction of arrow B in FIG. 1.
Figure 4:
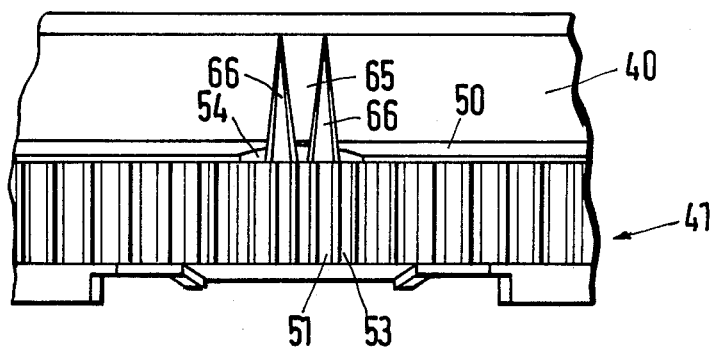
FIG. 4 is a view of the crown gear perpendicular to its axis.

To facilitate the mounting and to increase its security crown gear 41 is covered by a radial flange 50 above its teeth to the side of the housing 11. Flange 50, as best shown in FIGS. 2 and 3, does not reach as far as to the tip circle of the various teeth 51, but everywhere where it extends prevents a tooth 52 of the toothed wheel 31 from being pushed into a space width 53 of the crown gear 41. The flange 50 is integrally formed on the crown gear portion 40. In the middle of crown gear 41 a recess 54 is formed in flange 50, the shape of which recess corresponds to the tip circle of the toothed wheel 31. The middle of recess 54 lies in the middle of a space width 53 of the crown gear 41.

As has already been described piston 16 must occupy the rear stationary point when the toothed wheel 31 moves over the middle of the crown gear 41. Because the toothed wheel 31 can only engage the toothed wheel 41 through the recess 54 in the flange 50, the piston 16 must occupy its rear stationary point also during assembly. This can simply be achieved in that the piston 16 is pushed back into the housing 11 as far as possible. As has been mentioned there are two further correct meshing possibilities between the toothed wheel 31 and the crown gear 41 in the rear stationary point of the piston 6. Thus flange 50 could have two further recesses through which the toothed wheel 31 could be pushed into the crown gear 41, when the piston 16 occupies the rear stationary point. However, so that the relative position of the housing 11 to the base plate 37 is always the same, there is only one recess 54.

Figure 5:
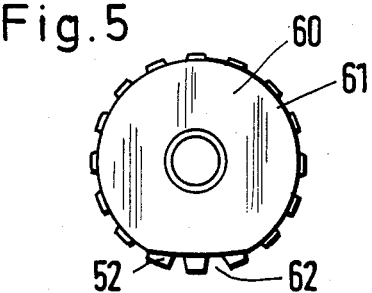
FIG. 5 is a toothed wheel which in contrast to the toothed wheel of FIG. 1 meshing with the crown gear has a cover.

FIG. 5 shows a toothed wheel 60 which can be used instead of the toothed wheel 31 of FIG. 1 and which is slightly modified in comparison with it. The teeth 52 of wheel 60 are covered by a flange 61 at their side not facing the housing 11. The flange does not cover a recess 62 whose shape corresponds to the tip circle of the crown gear 41. Thus the toothed wheel 60 may only be pushed into the crown gear 41 in a quite particular position relative to the housing 11. In co-operation with the recess 54 in the flange 50 of the crown gear 41 the toothed wheel 60 thus can only be pushed into the crown gear 41 in a single position of the piston 16 and only in a single position of the housing 11 relative to this crown gear. Therefore the mounting reliability is very high. A disadvantage of this example in comparison to that of FIG. 1 is that the toothed wheel 60 and the associated crank have to be mounted on the shaft 27 in an exact relative position to each other.

To facilitate mounting in the axial direction laterally of the crown gear 41 there is provided on the crown gear portion 40 a lead in member in the form of a lead in groove 65. The lead-in groove 65 is positioned in the elongation of the space width 53 which is located in the center of the recess 54. The lead-in groove 65 is formed by two small rails 66, of which each broadens towards a tooth 51. In the radial direction each small rail 66 tapers towards the tip circle of the crown gear 41 and ends at the level of the crown gear 41 so much in front of the tip circle of the crown gear as the flange 50.

In the center of the recess 54 of the flange 50 there is a space width 52 of the crown gear 41 into which a tooth of the toothed wheel 31 or of the toothed wheel 60 has to be pushed. Therefore the lead-in member is a lead-in groove.

If a space width of the toothed wheel 31 or of the toothed wheel 60 is slipped on a tooth of the crown gear 41, the lead-in auxiliary member will be designed as a lead-in rail. The small rails 66 act as lead-in members and are therefore beveled also on the side not facing the groove 65.

What is claimed is:

1. A reciprocating wiper system comprising:
   a gearing having first and second toothed wheels in meshed engagement with each other;
   a crank connected to said first wheel;
   a reciprocating element coupled to said crank;
   a wiper shaft carrying said first wheel, said second wheel being stationary relative to said wiper shaft;
   at least one wheel of said first or second wheels having a restraining element thereon, said restraining element preventing said first and second wheels from being axially moved into engagement with each other during assembly except when one tooth of one of said first or second wheels is in alignment with a predetermined space between adjacent teeth of the other wheel of said first or second wheels, said crank being in a predetermined position when said one tooth meshes said adjacent teeth.

2. A reciprocating wiper system in accordance with claim 1 wherein:

said restraining element comprises a cover on said one wheel and on the side thereof adjacent to said other wheel, said cover having at least one recess through which said one tooth may be pushed into said predetermined space during assembly.

3. A reciprocating wiper system in accordance with claim 2 wherein:
said recess substantially corresponds in shape to the tip circle of said other wheel.

4. A reciprocating wiper system in accordance with claim 2 wherein:
said recess is positioned such that a tooth of said one wheel is centered therein.

5. A reciprocating wiper system in accordance with claim 1 wherein:
said restraining element comprises a flange on said one wheel, said flange being on the side of said one wheel adjacent to said other wheel, said flange extending in a radial direction a predetermined distance to overlap the tip circle of said other wheel.

6. A reciprocating wiper system in accordance with claim 5 wherein:
said flange is integrally formed on said one wheel.

7. A reciprocating wiper system in accordance with claim 2 wherein:
said cover is integrally formed on said one wheel.

8. A reciprocating wiper system in accordance with claim 2 comprising:
a second cover on said other wheel on the side of said other wheel adjacent to said cover.

9. A reciprocating wiper system in accordance with claim 5 comprising:
a second flange on said other wheel on the side of said other wheel adjacent to said cover.

10. A reciprocating wiper system in accordance with claim 1 wherein:
said reciprocating element comprises a linearly guided slide and a coupling rod coupling said linearly guided slide to said crank;
said predetermined position corresponds to a stationary point of said linearly guided slide;
said slide being movable in pendulum fashion by said opening via said crank.

11. A reciprocating wiper system in accordance with claim 10 comprising:
a housing; and wherein
said slide is mounted in said housing and has a portion that is movable into and out of said housing.

12. A reciprocating wiper system in accordance with claim 1 wherein:
said one wheel is a stationary crown gear portion; and
said other wheel is a planet wheel mounted on a driveable housing.

13. A reciprocating wiper system in accordance with claim 12 comprising:
a shaft;
said housing being connected with said shaft in a manner protected against twisting, said housing being driven in pendulum fashion by said shaft; and wherein
said crown gear occupies an angular range smaller than 360 degrees of arc.

14. A reciprocating wiper system in accordance with claim 13 wherein:
said angular range is preferably about 180 degrees of arc.

15. A reciprocating wiper system in accordance with claim 14 wherein:
said restraining element comprises a cover on said crown gear.

16. A reciprocating wiper system in accordance with claim 15 wherein:
said cover has a recess in the center area of said crown gear across which said planet wheel moves.

17. A reciprocating wiper system in accordance with claim 1 wherein:
said one wheel includes a lead-in member extending in the axial direction, said lead-in member being tapered and being disposed to guide said other wheel into engagement with said one wheel during assembly of said system.

18. A reciprocating wiper system in accordance with claim 17 wherein:
said lead-in member comprises a groove.

19. A reciprocating wiper system in accordance with claim 18 wherein:
said groove is formed by two rails.

* * * * *